United States Patent [19]

Simon

[11] 4,083,039
[45] Apr. 4, 1978

[54] VOLTAGE ENHANCEMENT CIRCUIT FOR CENTRAL STATION MONITORED ALARM SYSTEMS

[75] Inventor: Theodore Simon, 9 Maplewood Dr., Plainview, N.Y. 11803

[73] Assignees: Theodore Simon; Barry Schweiger, both of Garden City, N.Y.

[21] Appl. No.: 625,084

[22] Filed: Oct. 23, 1975

[51] Int. Cl.² ............................................. G08B 21/00
[52] U.S. Cl. ................................ 340/248 R; 340/409; 340/210
[58] Field of Search .................... 179/5 R; 340/248 R, 340/210, 211, 409

[56] References Cited

U.S. PATENT DOCUMENTS

| | | | |
|---|---|---|---|
| 3,448,448 | 6/1969 | Rowley | 340/409 |
| 3,503,261 | 3/1970 | Riester | 340/210 |
| 3,517,556 | 6/1970 | Barker | 340/210 |
| 3,717,858 | 2/1973 | Hadden | 340/210 |
| 3,742,473 | 6/1973 | Hadden | 340/210 |
| 3,786,501 | 1/1974 | Marnerakis | 179/5 R |
| 3,845,247 | 10/1974 | Jurschak | 179/5 R |
| 3,872,253 | 3/1975 | Jurschak | 179/5 R |
| 3,956,741 | 5/1976 | Kraus | 340/211 |

*Primary Examiner*—Harold I. Pitts
*Attorney, Agent, or Firm*—Lackenbach, Lilling & Siegel

[57] ABSTRACT

A voltage enhancement device in the nature of a DC-to-DC converter is used in a centrally monitored alarm system of the type having at least one alarm detection device at a first location, an alarm monitoring panel at a second location, and telephone lines interconnecting the device in the panel. The telephone lines have an internal resistance which causes some of the voltage applied at the input of the lines at the first location to be dropped thereacross with resultant decrease in voltage at the second location. The alarm monitoring panel includes an indicator, such as a meter, which requires a minimum detectable voltage to provide a suitable indication or deflection of the meter to distinguish between an alarm, normal or trouble condition at the first location. The DC-to-DC converter only utilizes the voltage available at the first location and increases the magnitude of the voltage to compensate for the internal line resistance to assure that the voltage which is available at the second location is at least equal to the minimum detectable voltage.

10 Claims, 2 Drawing Figures

VOLTAGE ENHANCEMENT CIRCUIT FOR CENTRAL STATION MONITORED ALARM SYSTEMS

BACKGROUND OF THE INVENTION

The present invention generally relates to alarm systems, and more specifically to a voltage enhancement circuit for central station or police monitored alarm systems.

Frequently, an alarm system, whether residential or commercial, is connected to a police or other remote monitoring location by means of telephone lines. This often represents the least expensive means for making such a connection and eliminates the need for laying down new lines between the two locations which are to be in communication with each other. However, because the telephone lines invariably go through one or more central switching stations before connection is made to the desired location, this normally substantially increases the effective distance or length between the connected locations. Accordingly, the total length of the telephone cables which are required between each residential location, for example, and a police or monitoring station will vary in each case. Sometimes, because of the peculiar arrangement in which the telephone lines are initially set down, it may even be necessary to go to two or more central telephone stations before connection is made to the desired location. For these reasons, the total length of telephone cable between the protected area and the monitoring area cannot be predicted in advance until these protected and monitoring locations are selected.

Due to the substantial variations in telephone line length and therefore telephone line internal resistance between two interconnected locations, it has been a problem in the prior art insofar as compensating for the additional lengths of telephone cable which, as suggested, may vary from location to location. It is not uncommon, for example, for the telephone line resistance to vary over wide ranges, such as between 3K ohms and 10K ohms. Several prior art approaches for compensating for the voltage drops across telephone line resistance will now be briefly described.

The "police station" circuit is basically simple and includes a power supply which converts alternating house power to a DC voltage. In the event that house power is lost, conventional means may be provided for actuating an auxilliary power switch which places a stand-by battery into the circuit in place of the power supply to automatically take over the function of the power supply. A current limiting resistor is advantageously placed in series with the source of DC voltage at the monitored location for limiting the current drawn from the same in the event of a short circuit to thereby prevent damage to the power supply.

A major problem which has been encountered in the use of the monitoring systems under discussion has resulted from the frequently high internal telephone line resistance which has resulted in substantial voltage drops across the telephone lines leaving little voltage to be applied across the police station indicating mechanism, such as meter terminals. Application of very low voltages below the minimum desired detectable level, has resulted in false alarm indications which require investigation. Clearly, such false alarms increase the inefficiency of the system and also the attendant expense in operating the same.

The power supply and stand-by battery have nominal voltage outputs. Thus, when the telephone line resistance is abnormally high and a substantial portion of this nominal voltage is dropped across the telephone line, the voltage of the output of the lines may drop below the minimum desired detectable level. For the above reasons, there have been made several attempts for compensating for the drops of voltage across the internal line resistance of the interconnecting lines. Typically, the method used has consisted of utilizing additional batteries or power supplies, connected in series with the basic power supply, which are added after the system has been installed on location and the total telephone line length and internal resistance are determined. The additional sources of voltage are intended to compensate for the voltage drops. However, the use of batteries, for example, has presented a problem since these must constantly be replaced. Additionally, when supplemental batteries of this type are used to compensate for the telephone line drops and these batteries lose their charge, they represent very high series resistance which, in this condition, only aggravate the problem of high telephone line resistance. Instead of enhancing the line voltage when the supplemental batteries discharge, they actually still further decrease the voltage which is available at the police or monitoring station.

Another prior art approach at compensating for the voltage drops across the telephone lines has been to utilize a second power supply which is placed in series with the alarm voltage supply at the monitored location. However, this substantially increases the cost of the alarm and, since it is dependent on AC house current, is subject to power failure and, therefore, also requires stand-by batteries.

With the prior art methods of compensating for the telephone line voltage drop, the solutions to the problem are only achieved by the introduction of new problems.

SUMMARY OF THE INVENTION

Accordingly, it is an object of the present invention to provide a voltage enhancement circuit for central station monitored alarm systems which does not have the disadvantages above-described in connection with the prior art.

It is another object of the present invention to provide a voltage enhancement circuit which is simple in construction and economical to manufacture.

It is still another object of the present invention to provide an enhancement circuit of the type under discussion which may be easily and quickly installed into new or existing central station alarm systems.

It is yet another object of the present invention to provide an enhancement circuit as in the last objects which increases the voltage of the source at the monitored location without requiring additional sources of voltage.

It is a further object of the present invention to provide an enhancement circuit of the type generally above-described which selectively adjusts the magnitude of the magnified or amplified power source voltage to a value necessary to compensate for the telephone line voltage drops and to increase the voltage at the central station to at least the minimum desired detectable level irrespective of the length of the interconnecting telephone lines.

It is an additional object of the present invention to provide a voltage enhancement circuit which is fully compatable with existing police alarm systems and which can be used therewith irrespective of whether DC or AC currents flow through the telephone lines for detection at the central station.

It is still an additional object of the present invention to provide a voltage enhancement circuit suitable for use in police line amplifier alarm systems which is in the nature of a voltage transformer which selectively magnifies or amplifies a nominal voltage at a location to be monitored to an extent necessary to compensate for the telephone line voltage drops to insure at least minimum detectable voltage levels at the police station which can be clearly detected to thereby minimize false alarm conditions.

The invention in accordance with the present invention generally comprises a voltage enhancement means interposed between a source of voltage at a monitored location and the input terminal of a line which interconnects the source of voltage to an alarm monitoring panel provided with detection means. The voltage enhancement means increases the magnitude of the voltage source at the line input terminal to partly compensate for the voltage portion dropped across the line internal resistance. In this manner, the voltage at the output terminal may be increases to at least the minimum desired detectable level irrespective of the length of the interconnecting lines.

In the presently preferred embodiment, the present invention is in the nature of a DC-to-DC converter used as the voltage enhancement circuit. The precise nature of the DC-to-DC converter is not in and of itself critical since many designs for such converters are known. It is only important that the DC-to-DC converter be capable of utilizing the generally lower DC voltage appearing at the output of the power supply or the stand-by battery, and increasing its magnitude to a desired level to overcome the voltage drop across the telephone line resistance. Advantageously, the DC-to-DC converter is accurately and selectively adjustable to facilitate accurate compensation for the telephone line resistance voltage drop for each particular installation. Once the installation has been made, and therefore the amount of telephone line resistance which must be overcome has been fixed, the DC-to-DC converter can be adjusted accordingly so that the voltage which appears at the police or monitoring location may be maintained at substantially the power supply or stand-by voltage, to provide an unambiguous indication of the condition of the alarm system. When so compensated, the indication at the monitoring station provides a trouble indication only when there is a problem with the alarm system, such as a short or open on the line. However, when there are no trouble or alarm conditions at the protected area, the indicator will give a clear and unambiguous indication that the alarm is in its normal condition.

BRIEF DESCRIPTION OF THE DRAWINGS

Further advantages of the invention will become apparent from a reading of the following specification describing an illustrative embodiment of the invention. The specification is to be taken with the accompanying drawings of which.

DESCRIPTION OF THE PREFERRED EMBODIMENT

Figure 1:
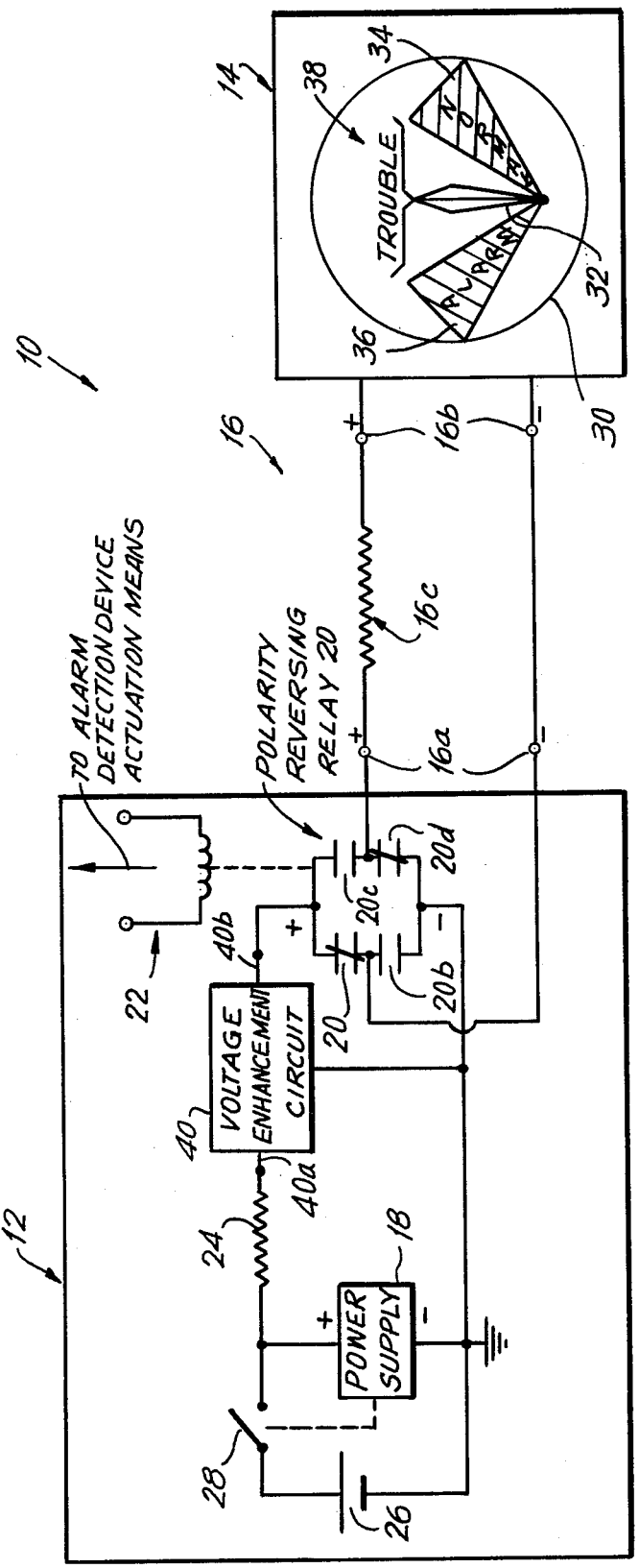
FIG. 1 is a simplified diagrammatic representation of a centrally monitored alarm system, showing diagrammatically the circuit connections in such a system and the manner in which the voltage enhancement circuit in accordance with the present invention is connected within the system.

Referring first to FIG. 1, there is shown a central station alarm system 10, which only shows the pertinent circuitry for enabling the condition of the alarm system to be monitored at a remote central or police station.

The alarm system 10, therefore, includes a control panel or box 12 which encloses the alarm detection device at one location which is the protected area. The known sensing element as well as the circuitry for producing an alarm condition upon detection of an alarm condition is not shown for purposes of clarity.

An alarm monitoring panel 14 is shown which is at a location remote from the protected location. Generally, a plurality of protected premises are all monitored at a single central station 14. To facilitate the description of the present invention, it will be assumed that only one alarm system is monitored at the remote panel or police station 14.

A pair of electrically conductive lines 16 normally telephone lines, interconnect the alarm detection device 12 with the alarm monitoring panel 14.

The telephone lines 16 have input terminals 16a at the location of the alarm detection device 12 and output terminals 16b at the alarm monitoring panel 14.

In accordance with the invention, the lines 16 may be telephone lines which, as described in the Background of the Invention, need not represent a continuous conductor but may instead be routed through various central telephone stations before the connection is finally made between the two locations of interest. After the connection has been made, however, the telephone lines 16 exhibit an internal resistance 16c between its input and output terminals, which resistance is a function of the distance between the locations and therefore a function of the length of the telephone lines.

Alarm systems, residential or commercial, which are tied into a central monitoring station, generally includes a power supply 18 within the control box 12. The power supply 18, when energized by AC house currents, converts the same into a DC voltage at the output terminals of the power supply.

The output terminals of the power supply 18 are advantageously connected across the input terminals 16a by way of an optional polarity reversing relay 20. The relay 20 includes two parallel branches of contacts, one branch including a normally closed contact 20a and a series connected normally open contact 20b, while the other branch contains a normally open contact 20c and a series connected normally closed contact 20d, as shown. The relay 20 includes a relay coil 22, the terminals of which are connected to the alarm detection device actuation means, which is not shown for purpose of clarity. When there is no alarm condition detected by the alarm detection device, then no voltage is applied to the coil 22 and the contacts of the relay 20 take on the conditions aforementioned and shown in FIG. 1. However, upon the occurrence of an alarm condition, the alarm detection device causes a potential to be applied to the relay coil 22 of sufficient magnitude to energize the relay 20 and to reverse the conditions of each of the contacts thereof. As should become evident, the application of a positive potential at the contacts 20a and 20c and a negative potential at the contacts 20b and 20d as shown results in a positive potential being applied to the input terminals 16a as indicated by the polarity signs. Upon the occurrence of an alarm condition, the alarm detection device causes the relay coil 22 to be energized with attendant changes in the conditions of each of the relay contacts. When all the contacts are changed from ther open to closed conditions and from their closed to open conditions, respectively, the power supply voltage is reversed at the input terminals 16a without change in the magnitude or absolute value of the voltage.

Advantageously, a current limiting resistor 24 is interposed between the power supply 18 and the input terminal 16a to prevent excess of currents from being drawn from the power supply 18 which may cause damage to the same.

As described above, the power supply 18 is energized from AC house current and is, therefore, susceptible to blackouts or power failures. For this reason, alarm systems are generally provided with a stand-by battery 26 which is connectable in parallel to the power supply 18 by an auxiliary power switch 28 which may be actuated by a power failure in a conventional manner. When such a stand-by battery 26 is used, it is normally provided with recharging means to maintain the battery 26 at full charge in the eventuality of a power failure.

At the police or monitoring station, the alarm monitoring panel 14 is provided with indicator means, such as indicator 30 which is in the nature of a meter movement. Normally, a plurality of indicators are provided, one to monitor the condition of the alarm at each protected area monitored. The indicator 30 includes a pointer 32 and a meter face marked with a "normal" zone 34 and an "alarm" zone marked 36, the "normal" and "alarm" zones being disposed to each side of a central trouble zone or area 38. The pointer 32 assumes a central or middle position as shown when there is no potential applied to the terminals of the meter or indicator 30. Application of a positive potential as indicated at the output terminals 16b causes a current to flow through the meter 30 to cause deflection of the pointer 32 into the normal zone 34. This condition exists when the relay coil 22 is de-energized and the contacts on the relay 20 assume their normal positions shown. When an alarm condition occurs, the relay coil 22 is energized, the relay contacts change their states to reverse the polarity across the telephone lines, while the magnitude of the potential is maintained the same. Accordingly, the pointer 32 will deflect to the opposite side of the central region an equal amount to bring the same within the alarm zone 36. If, for any reason, there is an open or a short circuit in the circuitry or in the telephone lines, then zero potential is applied to the meter 30 at the output terminals 16b and the pointer 32 assumes its normal central position indicating a trouble condition which is neither an alarm condition nor a normal condition.

While a polarity and reversing relay 20 has been described in conjunction with an indicator 30 having both normal and alarm zones, there is also used with such systems a two position indicator which does not require the use of a polarity relay. With such a system, the absence of an alarm condition causes the power supply voltage to be applied to the telephone lines with a given polarity to deflect the meter to a normal zone. Upon the occurrence of an alarm condition a suitable relay is actuated to open the circuits at the input terminals to the telephone lines to thereby remove the voltage applied thereto. With such a system, the meter will remain in a combination alarm and trouble zone whenever a voltage is not applied to the input terminals 16a.

What has been described above is a police or centrally monitored-type alarm system which is for the most part conventional in the prior art. As suggested above, the voltages of the power supply 18 and the stand-by battery 26 have nominal values and are applied at the input terminals 16a at approximately the full nominal value. However, as described above, a good portion of the voltage appearing at the input terminals 16a may be dropped across the internal resistance 16c, depending on the length and the characteristics of the telephone lines 16. Accordingly, while a relatively large voltage may be applied at the input terminals 16a, the voltage which is available at the output terminals 16b may be substantially less. As described above, a sufficient deflection of the pointer 32 is necessary in order to move from the trouble zone 38 to either the normal zone 34 or the alarm zone 36. In order to be deflected to one of these two end zones, the voltage which is applied to the terminals must have a magnitude above the minimum detectable level. Clearly, if the voltage applied to the indicator 30 is very small, then the deflection is not sufficient to bring the pointer 32 to one of the endmost zones 34, 36 but will be slightly deflected within and be maintained near the trouble zone 38. Thus, although no alarm condition exists, the pointer 32 is maintained within the trouble zone 38 due to the high voltage drop across the internal resistance 16c even though a normal condition subsists. As suggested above, this in reality causes a false alarm to be indicated and results in unnecessary service calls and expense.

An important feature, therefore, of the present invention is the provision of a voltage enhancement circuit 40 which is interposed between the power supply 18 and the telephone line input terminal 16a. The function of the voltage enhancement circuit 40, as will be more fully described hereafter, is for increasing the magnitude of the voltage supplied by the power supply 18 at the input terminal 40a of the circuit 40. The increased voltage appears at the output terminal 40b of the circuit 40 and is selected to have a magnitude which at least partially compensates for the voltage dropped across the telephone line 16 internal resistance 16c. In this manner, the voltage at the output terminals 16b may be increased to at least the minimum detectable level required to provide a reliable indication on the indicator 30 irrespective of the length of the interconnecting line 16.

The voltage enhancement circuit 40 unlike the prior art described in the Background of the Invention, is not a storage battery or a separate power supply. Instead, the circuit 40 is in the nature of a voltage transformer which transforms the voltage applied to the input 40a by either the power supply 18 or the stand-by battery 26 and transforms that voltage into a higher magnitude voltage. While the voltage enhancement circuit 40 described in the embodiment 10 in the nature of a DC transformer for increasing the magnitude of DC voltages, it should be clear that an AC transformer may similarly be utilized where AC currents are used in the alarm system police loop.

All the input voltages to the voltage enhancement circuit 40 are DC voltages as are the output voltages at the output terminals 40b, the circuit 40 is in the nature of a DC-to-DC transformer. Such transformers are commonly known as switching transformers.

As suggested above, the circuit 40 advantageously includes means for increasing the magnitude of the voltage at the output terminal 40b and means for selectively adjusting the increased magnitudes to any desired level. In this manner, the circuit 40 may be adjusted to compensate for voltage drops across the internal resistance 16c of the telephone lines 16 and for insuring a voltage level at the output terminal 16b at least equal to the minimum detectable level at the input to the indicator 30.

Where the circuit 40 includes an AC voltage transformer, an adjustable voltage regulator may be provided for adjusting the output of the voltage converter. Where the voltage regulator is a DC regulator, the circuit 40 further includes a rectifier circuit interposed between the transformer and the regulator for converting the AC voltage at the output of the transformer into a DC voltage at the input to the regulator. However, once the voltage has been increased in magnitude, a simple voltage divider may be utilized to selectively reduce the output of the transformer in place of using the adjustable voltage regulator.

Figure 2:
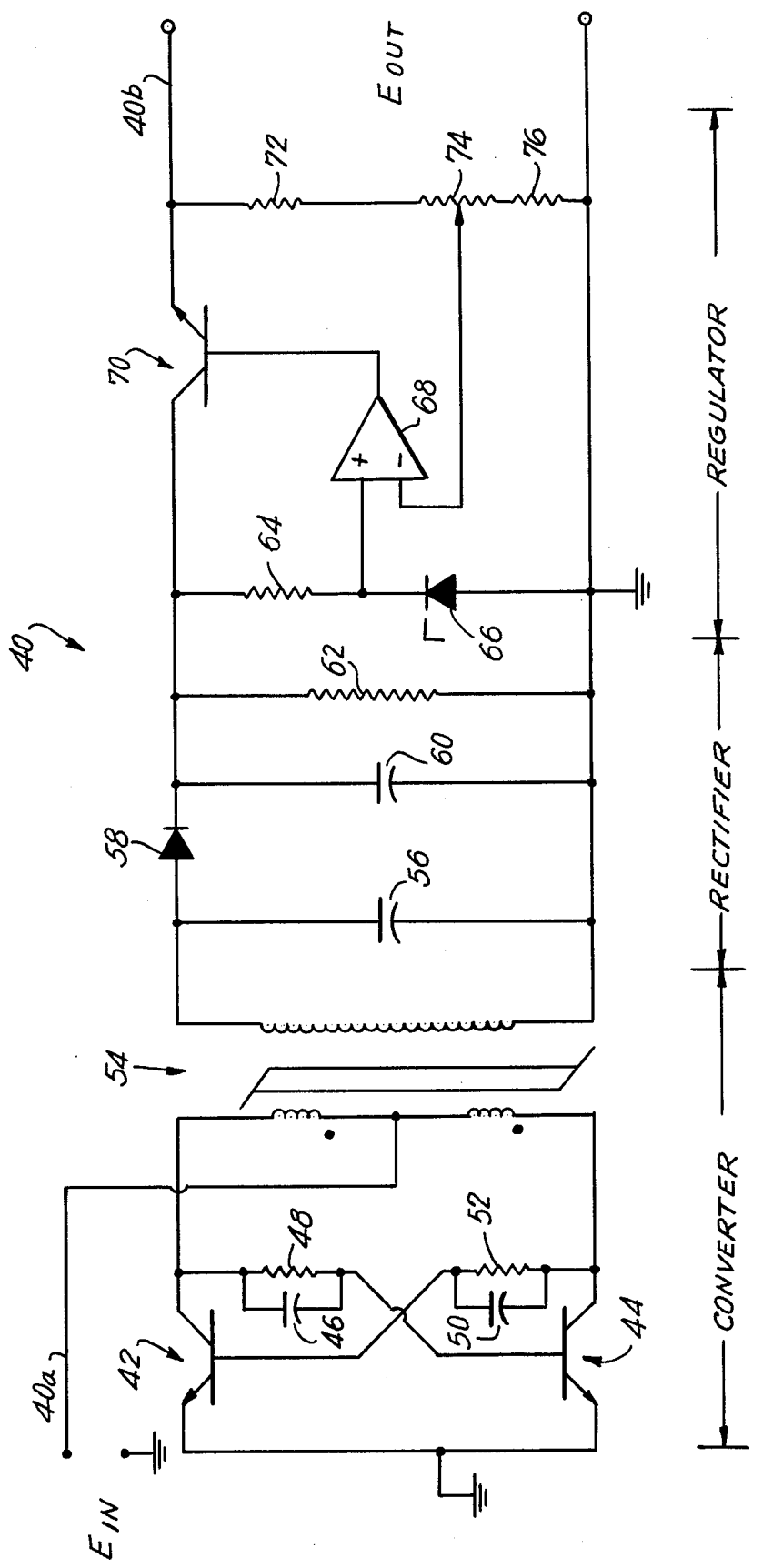
FIG. 2 is a schematic diagram of an illustrative voltage enhancement circuit which is in the nature of a DC-to-DC converter which may be utilized for the application shown in FIG. 1.

The above-described transformers or converters, rectifiers and regulators are each in and of themselves well-known to those skilled in the art. There are many designs for these basic building blocks and, for this reason, the voltage enhancement circuit 40 has been shown in block diagram form in FIG. 1. However, by way of illustration only, a schematic representation is shown in FIG. 2 of a possible circuit which may be utilized in an alarm system which uses direct currents. As shown, the enhancement circuit 40 includes a converter section, followed by a rectifier section and a regulator section.

The converter section includes a pair of grounded emitter transistors 42 and 44, a parallel connection of a capacitor 46 and resistor 48 being connected between the collector of the transistor 42 and the base of the transistor 44. Similarly, a parallel connection of a capacitor 50 and a resistor 52 is connected between the collector of the transistor 44 and the base of the transistor 42. A saturable core reactor 54 is connected in the collector circuits of the transistors 42 and 44. Generally, a DC voltage applied between the input terminals 40a and the ground is chopped up into a square wave at the primary side of the saturable reactor, the frequency of which is the function of the collector resistors and capacitor pairs as well as the characteristics of the saturable core reactor 54. The operation of the converter circuit shown is more fully described in "Wave Generation and Shaping," second edition, by Leonard Strauss, McGraw-Hill Book Company, 1970, starting at page 640.

Clearly, by selecting the turns ratio of the primary and secondary coils of the saturable core reactor 54, a substantial range is available for increasing the magnitude of the square wave or output pulses at the secondary winding of the reactor.

Where, as here, a direct current is desired to flow through the telephone lines 16 and be detected by the indicator 30, the pulses at the secondary of the reactor 54 are rectified in a conventional manner. In FIG. 2, the rectifier includes a first filtering capacitor 56, a series connected diode 58, a second filtering capacitor 60 and a resistor 62. The use of such rectifying circuits in conjunction with DC-to-DC converters is well known for converting a fluctuating voltage to a substantially constant voltage. For examples of such use, reference is made to "DC-DC Converter," Burroughs, Plainfield, N.J., application note No. 1087A, 1967.

Once a constant or DC voltage having a sufficiently high magnitude has been attained, a regulator circuit is advantageously provided following the rectifier circuit for regulating the output voltage at the terminals 40b as well as for permitting adjustments of the magnitude of the output voltage to thereby permit accurate compensation for the internal line resistance on location after the alarm system has been installed. In the circuit shown in FIG. 2, the regulator circuit includes a current limiting resistor 64 connected in series with a tener diode 66, the series combination being connected across the output of the rectifier circuit. The connection point where the resistor 64 and the tener diode are joined is connected to the positive input terminal of an operational amplifier 68. The output terminal of the operational amplifier 68 is connected to the base of a series-connected transistor 70 which acts as a valve for controlling the amount of current which may flow to the output terminal 40b.

Connected between the emitter of the transistor 70 and the ground point of the circuit is a series combination of a first fixed resistor 72, a variable potentiometer 74 and another fixed resistor 76 as shown. The slider terminal of the potentiometer 74 is connected to the negative input terminal of the operational amplifier 68. In this circuit, the operational amplifier isolates the voltage reference from load changes, thus improving the load regulation. The simple voltage divider comprising the resistors 72, 74 and 76 permits changes of the output voltage over moderate ranges of the input voltage. For a more detailed description of the regulator circuit, see "Applications for Fully Compensated Op-Amp ICs" EEE, January 1969, pages 63-65.

As should be clear from the above description, the specific design for the DC-to-DC converter is not in and of itself critical as long as it performs the above-described functions of magnifying the amplitude of the DC voltage provided by the power supply. Advantageously, the converter provides means for selectively adjusting the level of the output voltage to compensate for the voltage drop across the internal resistance of the telephone lines after the alarm system has been installed at the desired location and the length of the telephone lines required for interconnection of the associated devices has been determined.

It is to be understood that the foregoing description of a presently preferred embodiment illustrated and described herein is exemplary rather than definitive in nature and various modifications to the embodiment shown herein may be made without departing from the spirit and scope of the invention.

What is claimed is:

1. In combination with a centrally monitored alarm system of the type having at least one alarm detection device at a first location, an alarm monitoring panel at a second location, and electrically conductive lines interconnecting said device and said panel, the lines having an input terminal at said first location and an output terminal at said second location, the lines having an internal resistance between said terminals which is a function of the distance between said locations and therefore a function of the length of the lines, the detection device having a source of voltage of substantially fixed or constant magnitude or level which is applied to the input terminals of the lines in one condition of the alarm detection device, a portion of the voltage applied to said input terminals being dropped across said internal resistance and an output portion of the voltage applied to said input terminals appearing at said output terminals, and the monitoring panel including indicator means for providing an indication of said one condition of the alarm detection device when said output voltage portion at said output terminal has a magnitude above a minimum detectable level; and voltage enhancement means interposed between said source of voltage and said line input terminal for increasing the magnitude or level of said voltage source at said input terminal to at least partially compensate for said voltage portion dropped across said line internal resistance, whereby the voltage at said output terminal may be increased to at least said minimum detectable level irrespective of the length of the interconnecting lines.

2. In a centrally monitored alarm system as defined in claim 1, wherein said voltage enhancement means comprises a voltage transformer.

3. In a centrally monitored alarm system as defined in claim 2, wherein said source of voltage is an AC source, and said transformer is an AC transformer.

4. In a centrally monitored alarm system as defined in claim 2, wherein said source of voltage is a DC source, and said transformer is a DC transformer.

5. In a centrally monitored alarm system as defined in claim 4, wherein said transformer is a DC-to-DC transformer.

6. In a centrally monitored alarm system as defined in claim 5, wherein said DC-to-DC transformer is a switching transformer.

7. In a centrally monitored alarm system as defined in claim 1, wherein said voltage enhancement means includes means for increasing the magnitude of the voltage of said voltage source and means for selectively adjusting the increased magnitude, whereby said enhancement means may be adjusted to compensate for voltage drops across said internal resistance of the line and for insuring a voltage level at said output terminal at least equal to said minimum detectable level.

8. In a centrally monitored alarm system as defined in claim 7, wherein said voltage enhancement means comprises an AC voltage transformer and an adjustable voltage regulator for adjusting the output of said voltage transformer.

9. In a centrally monitored alarm system as defined in claim 8, wherein said voltage regulator is a DC regulator, and further comprising a rectifier interposed between said transformer and said regulator for converting the AC voltage at the output of said transformer into a DC voltage at the input to said regulator.

10. In a centrally monitored alarm system as defined in claim 7, wherein said means for selectively adjusting the increased magnitude voltage comprises a voltage divider.

* * * * *